United States Patent
Lu (10) Patent No.: US 7,010,839 B2
(45) Date of Patent: Mar. 14, 2006

(54) STRUCTURE OF A TWIN DISC TYPE TOOL TURRET MECHANISM FOR CNC MACHINES

(75) Inventor: Yung-Hsiang Lu, Chiayi (TW)

(73) Assignee: Factory Automation Technology Co., Ltd., Chiayi (TW)

( * ) Notice: Subject to any disclaimer, the term of this patent is extended or adjusted under 35 U.S.C. 154(b) by 143 days.

(21) Appl. No.: 10/827,264

(22) Filed: Apr. 20, 2004

(65) Prior Publication Data

US 2005/0229371 A1   Oct. 20, 2005

(51) Int. Cl.
  *B23P 23/02* (2006.01)
  *B23B 3/16* (2006.01)
  *B23B 29/30* (2006.01)
  *B23B 29/32* (2006.01)
  *B23B 39/20* (2006.01)

(52) U.S. Cl. .................. 29/36; 29/39; 29/40; 29/41; 29/48.5 A; 82/159; 74/826; 74/813 L (58) Field of Classification Search .............. 29/36, 29/39–41, 44, 46, 48.5, 49, 48.5 A; 82/159, 82/120–121; 74/813 R, 825, 826–826, 813 L See application file for complete search history.

(56) References Cited

U.S. PATENT DOCUMENTS

| | | | | |
|---|---|---|---|---|
| 3,786,539 A | * | 1/1974 | Foll et al. | 29/36 |
| 3,798,721 A | * | 3/1974 | Schalles | 29/42 |
| 4,051,750 A | * | 10/1977 | Berly | 29/36 |
| 4,087,891 A | * | 5/1978 | Schering | 29/36 |
| 4,180,894 A | * | 1/1980 | Link | 29/36 |
| 4,706,351 A | * | 11/1987 | Chuang | 29/39 |
| 4,785,513 A | * | 11/1988 | Lee et al. | 29/40 |
| 4,991,474 A | * | 2/1991 | Thumm et al. | 82/159 |
| 5,117,544 A | * | 6/1992 | Kousaku et al. | 29/36 |
| 6,640,404 B1 | * | 11/2003 | Sheehan et al. | 29/40 |

* cited by examiner

*Primary Examiner*—Erica Cadugan
(74) *Attorney, Agent, or Firm*—Rosenberg, Klein & Lee (57) ABSTRACT

A tool turret mechanism includes internal and external tool turrets, a toothed ring secured to the internal tool turret, a central shaft secured to the external turret, a power switch, and a clutch; the central shaft has a piston fitted thereto; the power switch is used for providing power to the internal and the external turrets through the toothed ring and the shaft respectively; the clutch includes a fixed clutch claw, external and internal ring clutch claws, which are respectively securely connected to inner edge of the internal turret, and inner edge of the external turret; the ring clutch claws will rotate, and engage each other; when the piston is actuated, and displaced, the external turret will be forced to change position, and both the turrets will be left and right displaced between a first position, in which they engage the clutch, and a second position, in which they disengage the clutch.

7 Claims, 7 Drawing Sheets

STRUCTURE OF A TWIN DISC TYPE TOOL TURRET MECHANISM FOR CNC MACHINES

BACKGROUND OF THE INVENTION

1. Field of the Invention

The present invention relates to a twin disk type tool turret mechanism for a NC machine, more particularly one, which is equipped with single stepper motor or a servomotor, instead of conventional hydraulic mechanism, as the power source for internal and external tool turrets thereof such that the turret mechanism can be improved in respect of efficiency and reliability, and can be used with a precision control for increasing the efficiency in tool choosing action, and can be made simpler in the structure.

2. Brief Description of the Prior Art

In U.S. Pat. No. 4,706,351, a twin disk type tool turret mechanism is taught, which includes:

a turret housing;

front turret and a rear turret means mounted in the housing, the two turrets being mounted so that they can be separately rotated for tool selection with said rear turret being axially fixed and said front turret being axially moveable;

three-piece toothed coupling means having first, second and third coupling elements connected respectively to the front turret, rear turret and turret housing means for interlocking the front and rear turrets against rotation, the coupling elements being constructed so as to be unlocked upon axial movement of the front turret away from the rear turret by disengagement of the teeth of one of the first or second coupling elements from the teeth of the third coupling element and the other of the first or second coupling elements to release said turrets for rotation;

several OD turning tools and a first workpiece measuring probe radially disposed on the front turret for outside cutting and measuring operations;

annular body means on the rear turret adapted to receive several devices from the group consisting of boring tools, a second workpiece measuring probe, rotary tools for milling and drilling, end lathe tools and OD turning tools, which are axially disposed on a periphery of the annular body means;

transmission means including a hydraulic cylinder device and a gearing system installed in said turret housing means and mechanically connected to both turrets for separately operating the turrets;

a hydraulic system provided in the turret housing and functionally coupled with the transmission means and the turrets for respectively controlling the rotation of the turrets;

inter-disc contact means and inductive signal transmission means respectively installed in the front and rear turrets for automatically measuring outside and inside diameters of a workpiece in process; and a cutting fluid supply system, including a passageway extending along the central axis of the turret housing means, for supplying cutting fluid to any tool in an active position during the operation of either turret.

Thus, both turrets can be separately operated without interference and tools can be operationally disposed in the turrets without increasing the turret size.

Although the tool turret mechanism can help increase efficiency and speed of NC lathes, it is found to have disadvantages as followings:

1. Because single hydraulic motor is used as the power source, for which the hydraulic oil passages are relatively complicated in structure, maintenance cost of the whole machine will increase. And, switching mechanisms, and control, which are used together with the hydraulic motor, are also expensive, and cost much to maintain.
2. Because conventional hydraulic motors have relatively long reaction time in switching and controlling, the power source, i.e. the hydraulic motor, isn't efficient, not suitable for use with high speed machining centers.
3. Because the front and the rear turrets are actuated with the hydraulic power, there have to be two sets of rotary switches respectively provided for the front and the rear turrets. Consequently, there will be too many joints, increasing the cost and failure rate.
4. Cutting fluid is supplied to the front tool turret, and the rear tool turret in sequence through the central shaft therefore fluid passages have complicated structure, and cost much to build. Furthermore, the cutting fluid guiding mechanism has to be made such that water supply can stop when the front tool turret is in a certain one of the various positions; thus, water supply can be first made to stop before each switching action. Otherwise, water will be ejected, and efficiency of tool choosing action will be reduced. Therefore, the cutting fluid guiding mechanism is not convenient.
5. The front and the rear tool turrets are separately actuated, and have small spaces in between. Consequently, cuttings and dirt will be deposited in the small spaces between the front and the rear turrets to cause the precision of the turrets to reduce.
6. There has to be more space provided for containing the complicated cutting fluid passages as well as for allowing switching of the cutting fluid guiding mechanism therefore the length of the shanks of tools, and the distance between outer ends of the front and the rear turrets have to be increased. Consequently, dimension, weight, and cost of the whole machine will increase, and the turret mechanism isn't suitable for high speed machining, and the precision of machining can't be maintained, and the surface of work pieces will be rougher, and service life of the tools can be shortened.

SUMMARY OF THE INVENTION

It is a main object of the present invention to provide a twin disk type tool turret mechanism to overcome the above disadvantages.

In the present tool turret mechanism, single servomotor or single stepper motor is used as the power source, and direction of transmission of power is controlled with the help of pistons and the transmission shaft; there is no need for hydraulic motors, complicated oil passages or control mechanisms for hydraulic motors therefore purchase and maintenance cost can be reduced. And, final gear ratio of power transmission to the internal turret is equal to that of power transmission to the external turret, and the present mechanism is suitable for use with high speed machining center. Cuttings and dirt won't be deposited in a small space between the internal and the external turrets because size of the small space between the turrets can't be changed. Therefore, precision of the turrets can't be reduced by cutting and dirt deposit. Cooling water guiding unit is away from the central part of the present turret mechanism, and not passed through the central shaft therefore the turret mechanism has simpler structure, and takes less cost to build. The water supply passages and the switching mechanism for the water supply passages are simplified in the structure therefore the distance between edges of the turrets can be shortened, and weight of the turrets reduces, and the shank of a tool used for boring a work piece doesn't have to be projected as long as before, allowing precision of boring to be increased, and allowing high speed machining.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
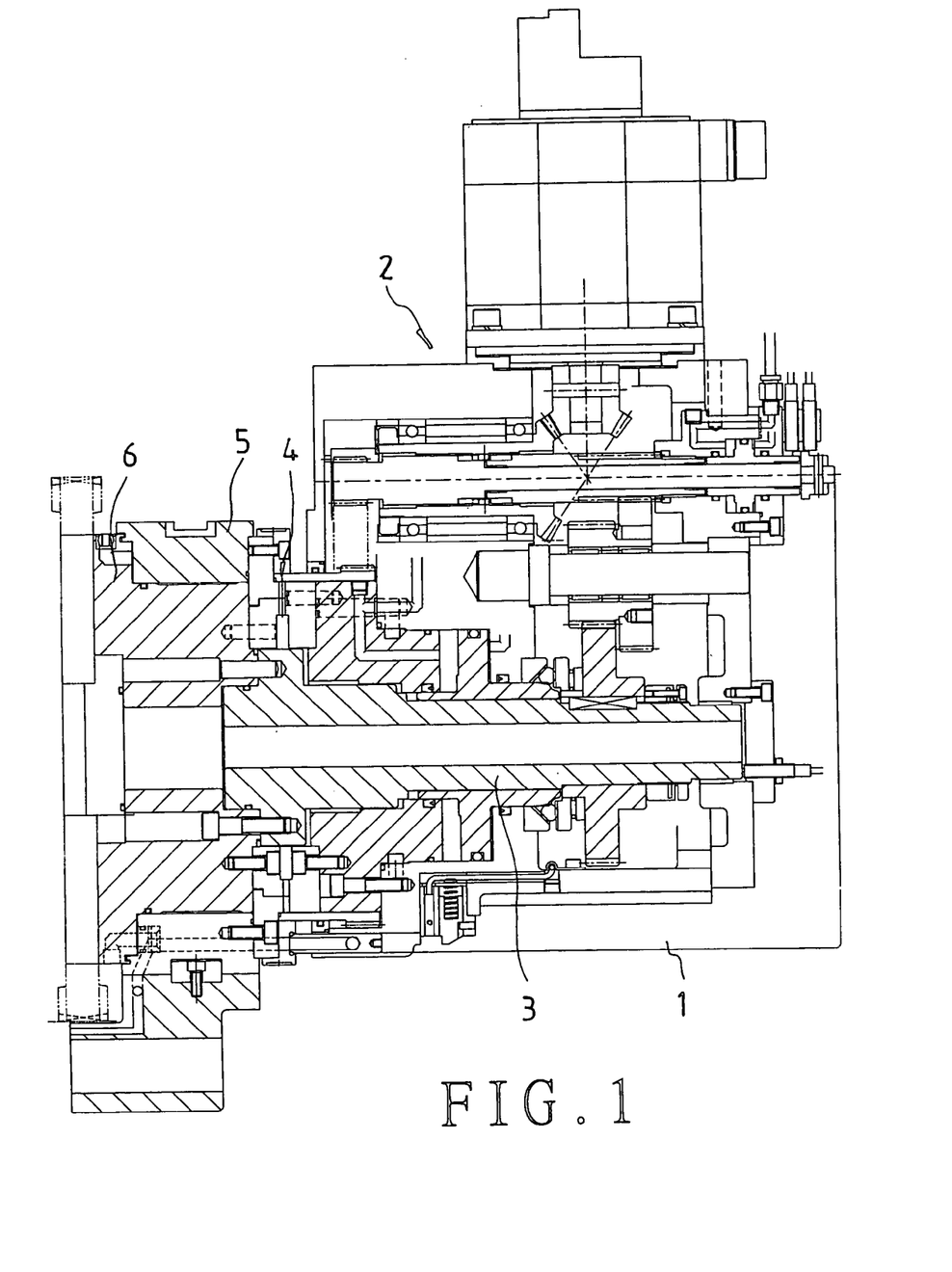
FIG. 1 is a view of the present tool turret mechanism (1)

Referring to FIG. 1, a preferred embodiment of a twin disk type tool turret mechanism in the present invention includes a turret housing 1, a power switching mechanism 2, a central shaft 3, a clutch 4, an internal turret 5, and an external turret 6.

Figure 2:
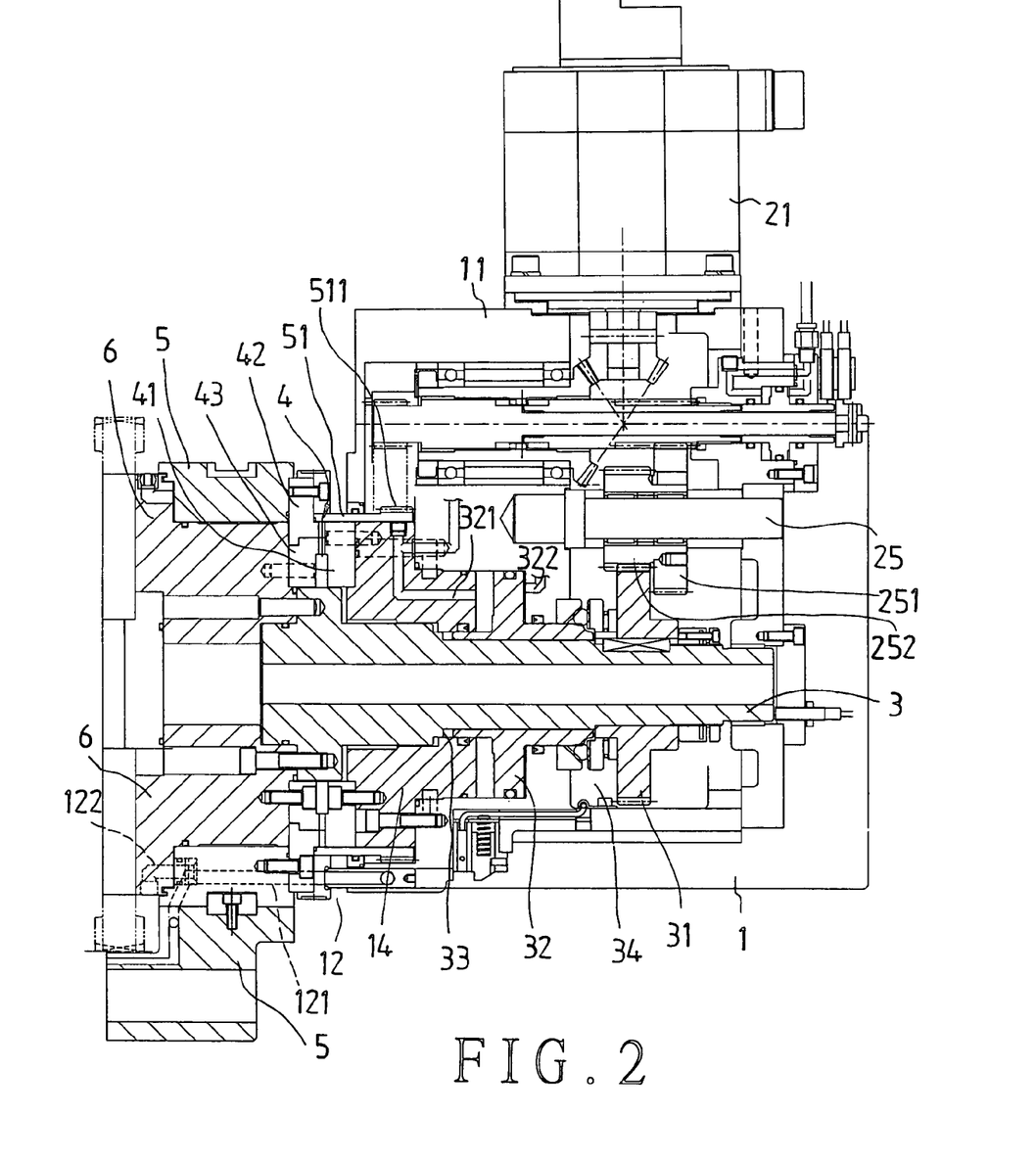
FIG. 2 is a view of the present tool turret mechanism (2)
Figure 3:
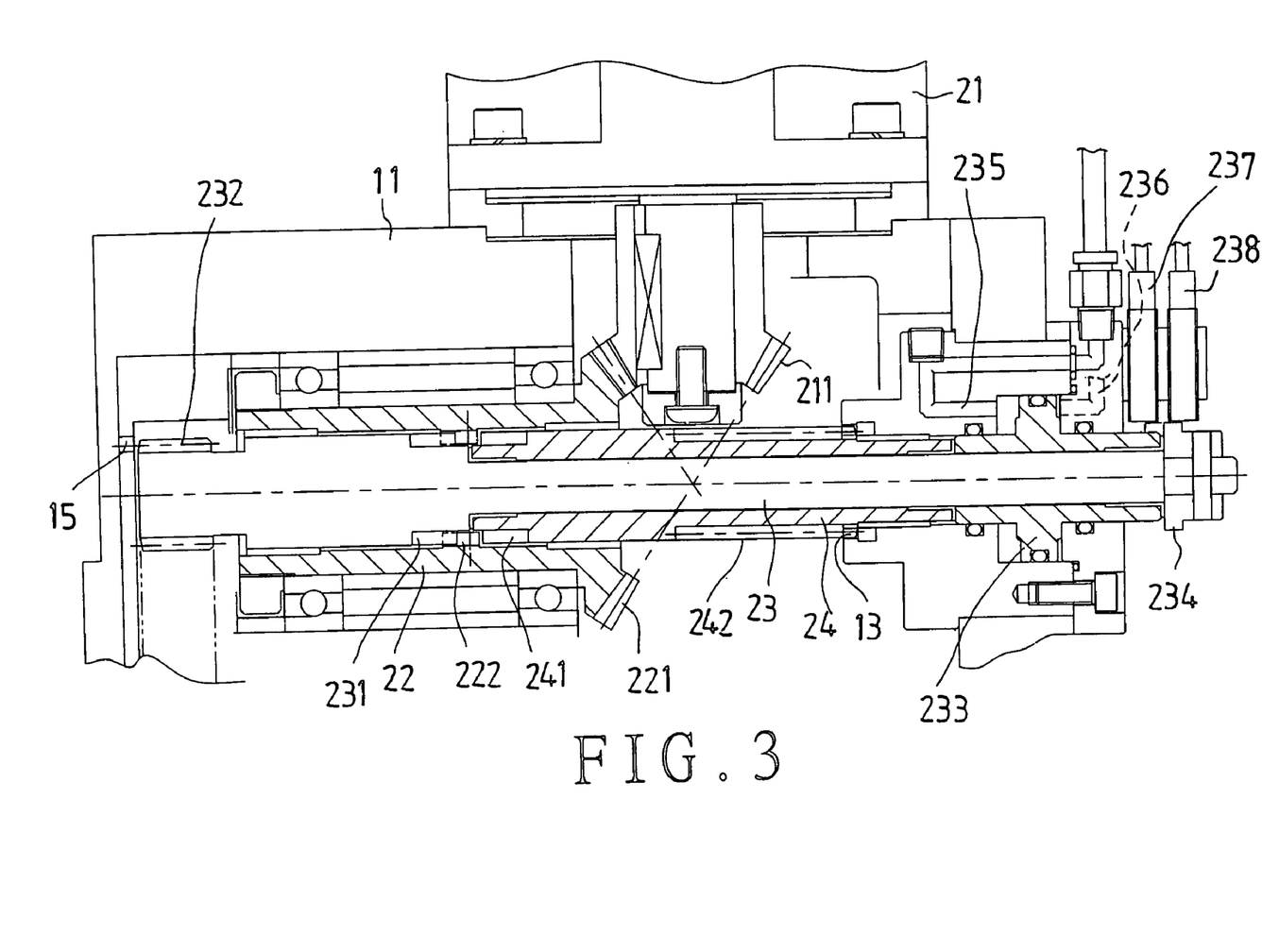
FIG. 3 is a cross-sectional view of the tool turret mechanism of the present invention, showing power switching action.
Figure 4:
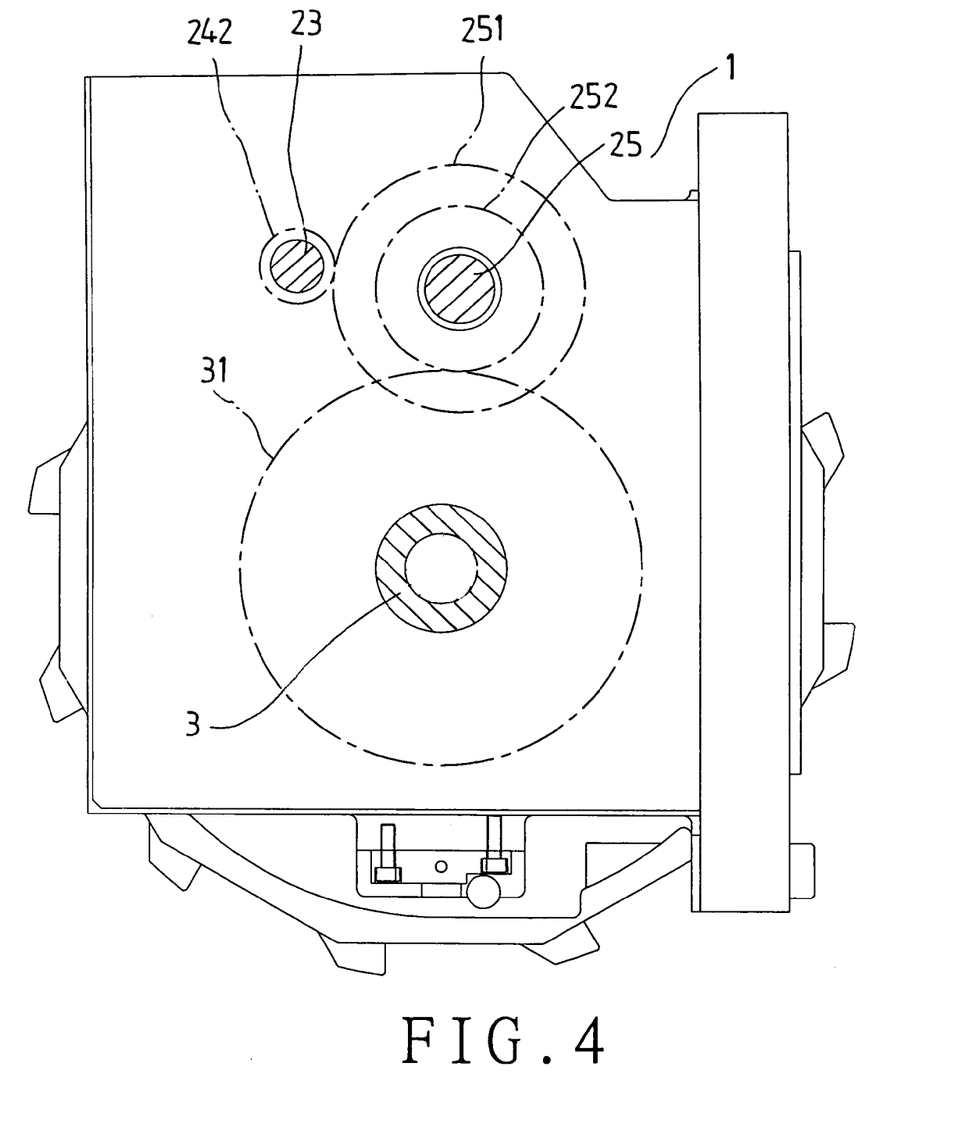
FIG. 4 is a partial view of the present invention, showing power transmission (1)
Figure 5:
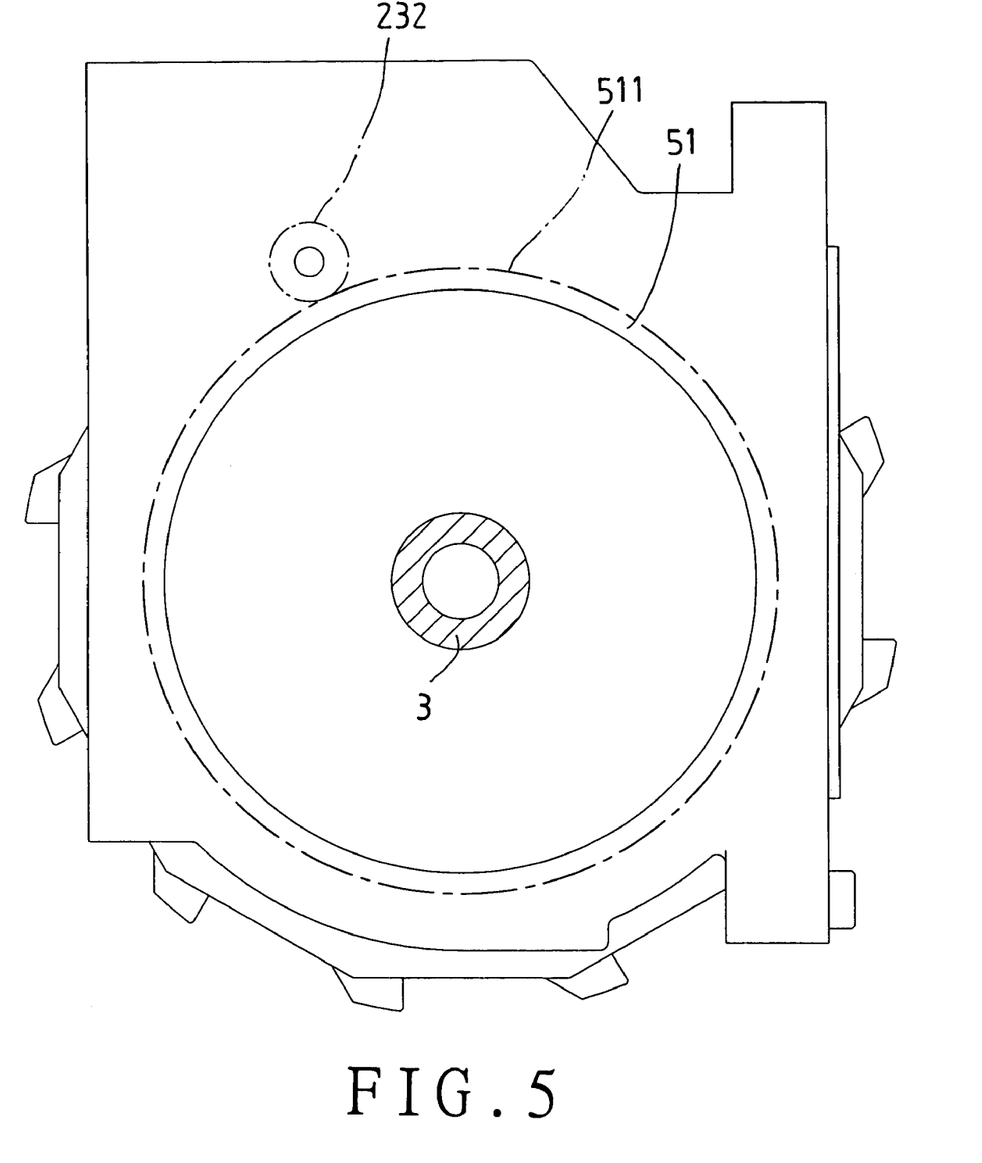
FIG. 5 is a partial view of the present invention, showing power transmission (2)

Referring to FIGS. 1 to 3, the turret housing 1 has a projecting seat 11, and is equipped with a water guiding unit 12, which has through holes 121, and 122, on the other side of the projecting seat 11; thus, cutting fluid can flow into the internal turret 5 as well as the external turret 6 through the holes 121, 122 of the water guiding unit 12. A power source 21 of the power switching mechanism 2 is secured to the projecting seat 11, which power source 21 can be a stepper motor or a servomotor.

The power source 21 of the power switching mechanism 2 has a bevel gear 211 connected thereto, which is engaged with a bevel gear 221 of a rotary sleeve 22. The rotary sleeve 22 has a central hole, and a transmission shaft 23 as well as a transmission sleeve 24 is rotary in the central hole of the rotary sleeve 22. In addition, the rotary sleeve 22 is formed with engaging teeth 222 on a middle section thereof, which can be disengageably engaged with engaging teeth 231 of the transmission shaft 23, and engaging teeth 241 of the transmission sleeve 24.

The transmission shaft 23 has a pinion 232 on a left end thereof, and is passed through the transmission sleeve 24 at a right end thereof; which right end has a piston 233 and a detection ring 234 secured thereon after having passed through the transmission sleeve 24. Passage conduits 235, and 236 are connected to a hydraulic mechanism, and the piston 233 can be moved left and right by means of operating the hydraulic mechanism such that the transmission shaft 23, and the transmission sleeve 24 are changed between a first position, wherein they engage the rotary sleeve 22, and a second one, wherein they disengage the rotary sleeve 22. Left and right detecting devices 237, and 238 are provided such that the distance of displacement and position of detection ring 234 can be registered with the detecting devices 237, and 238, as shown in FIG. 3.

The transmission sleeve 24 has gear teeth 242 on the other end thereof, which is constantly engaged with a gear wheel 251 of a shaft 25, and which can be disengageably engaged with an internal toothed section 13 on the right side of the turret housing 1. The shaft 25 is arranged in the projecting seat 11, and a pinion 252 is securely joined to the gear wheel 251, and engaged with a gear 31 of the central shaft 3; thus, power can be passed on to the central shaft 3 to rotate the shaft 3.

The central shaft 3 has a large piston 32 positioned around a middle portion thereof. The central shaft 3 further has a step-shaped portion 33, and a push ring 34. Passage conduits 321, and 322 are connected to a power source, which can be a hydraulic mechanism or an air pressure one, and the large piston 32 can be moved left and right by means of operating the power source such that the central shaft 3 moves left and right with the help of the large piston 32, the step-shaped portion 33, and the push ring 34, as shown in FIG. 2.

The turret housing 1 has a fixing ring 14 secured thereto, and an external toothed ring 51 fitted on outer side of the fixing ring 14 while a fixed clutch claw 41 of the clutch 4 is secured on a left side of the fixing ring 14. The external toothed ring 51 has a gear 511 on a right end thereof, which is engaged with the pinion 232 while an external ring clutch claw 42 secured on the other end of the external toothed ring 51. The internal turret 5 is secured to the external ring clutch claw 42 so as to be made to rotate by means of the clutch claw 42, as shown in FIGS. 2, 5, 6, and 7.

Figure 6:
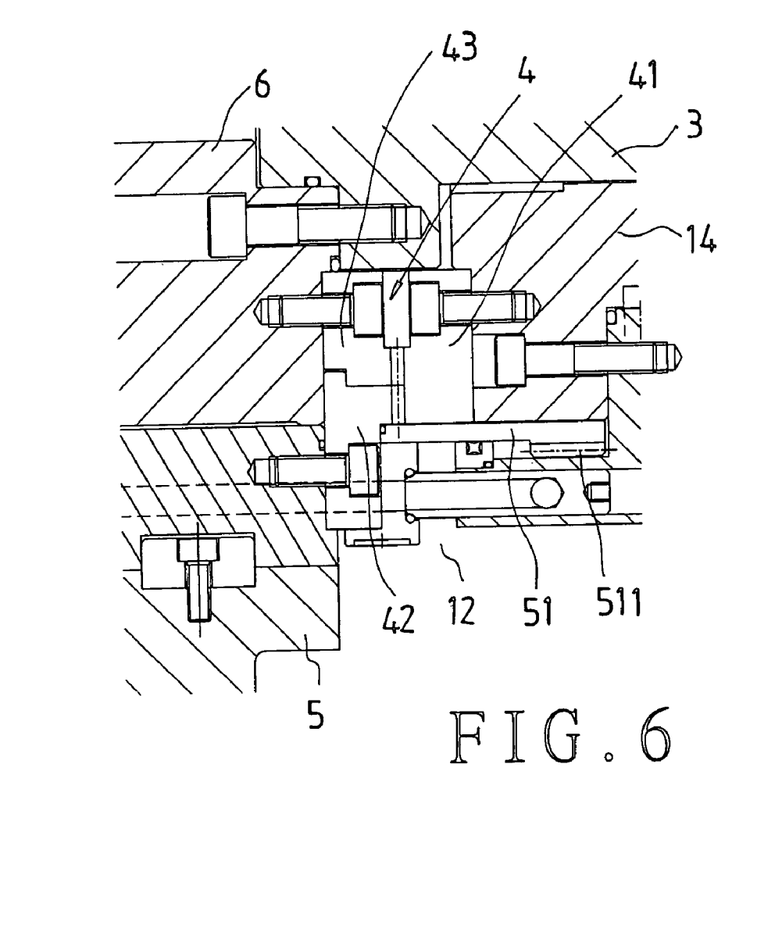
FIG. 6 is a partial cross-sectional view of the tool turret mechanism of the present invention in operation (1)
Figure 7:
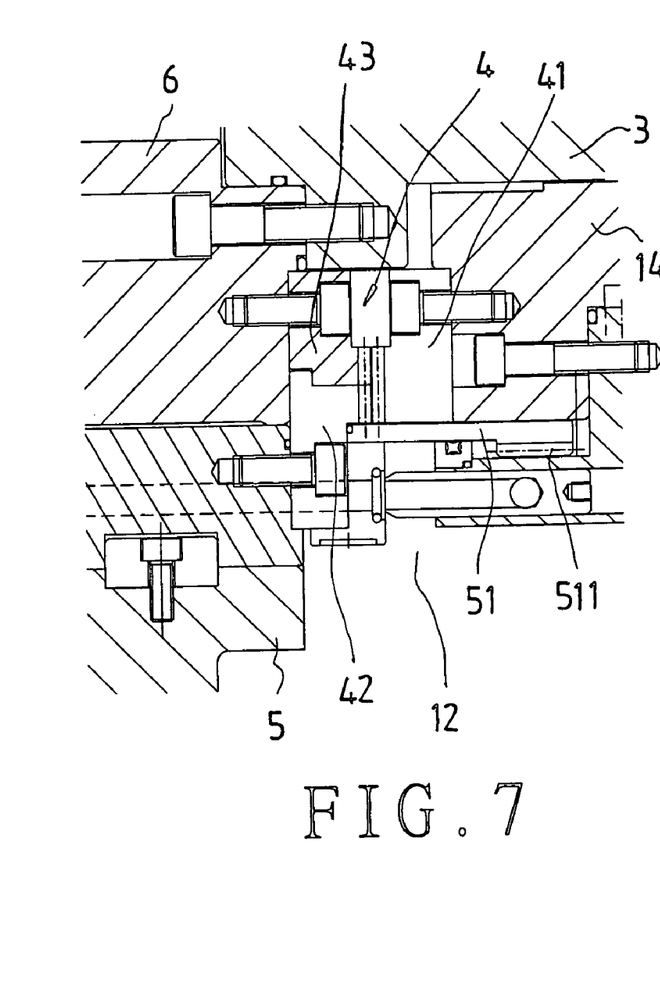
FIG. 7 is a partial cross-sectional view of the tool turret mechanism of the present invention in operation (2)
Figure 8:
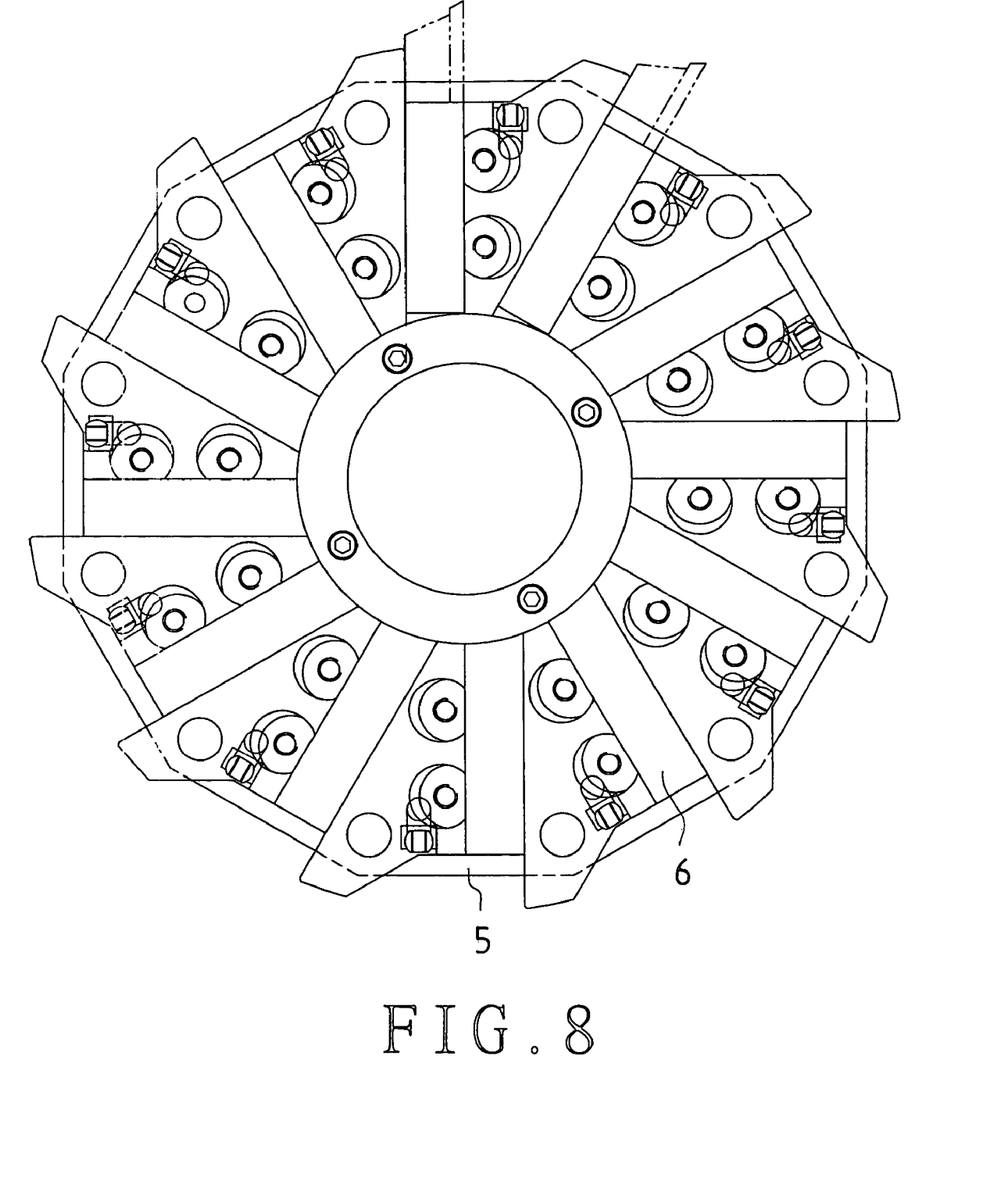
FIG. 8 is a side view of the present tool turret mechanism.

The external ring clutch claw 42, and an internal ring clutch claw 43 are engaged with each other at convexities and concavities formed thereon, and the internal ring clutch claw 43 is securely connected to the external turret 6 while the external turret 6 is securely connected to the central shaft 3; thus, while the large piston 32 is moving left and right to cause displacement of the central shaft 3, the internal and the external turrets 5 and 6 will be simultaneously displaced, and the internal and the external ring clutch claws 43 and 42 will be moved between an engaged position, wherein they are engaged with the fixed clutch claw 41, and a disengaged position, wherein they are separated from the fixed clutch claw 41, as shown in FIGS. 6 and 7.

The whole clutch 4 is in the engaging position, and forced to stay at right side without possibility of displacement by means of the large piston 32, thus making the internal and the external turrets 5 and 6 secured in position for allowing machining operation, as shown in FIGS. 2 and 6; the power source 21 mustn't rotate to provide or switch power at this stage. In addition, final gear ratio of power transmission to the internal turret 5 through the transmission shaft 23 is equal to that of power transmission to the external turret 6 through the transmission sleeve 24.

When the large piston 32 moves leftwards to get into contact with the step-shaped portion 33, and push the central shaft 3 leftwards, the internal and the external turrets 5 and 6 will be moved leftwards simultaneously, and the internal and the external ring clutch claws 43 and 42 will be separated from the fixed clutch claw 41, as shown in FIG. 7; thus, after the power source 21 is activated, power can be transmitted to the internal turret 5 via the bevel gear 221, the engaging teeth 222, the pinion 232, the gear 511, and the external ring clutch claw 42, and the internal turret 5 is rotated for tool-choosing action.

When the internal and the external ring clutch claws 43 and 42 are not engaged with the fixed clutch claw 41, the piston 233 will move leftwards such that the gear 242 of the transmission sleeve 24 is separated from the right internal toothed section 13, and the engaging teeth 241 is engaged with engaging teeth 222, and such that the engaging teeth 231 of the transmission shaft 23 is disengaged, and the pinion 232 is pushed to move leftwards into, and engage, a left internal toothed section 15; the transmission shaft 23 being secured in position to not transmit power while power is transmitted to the external turret 6 to rotate the same for tool choosing and replacing action via the transmission sleeve 24, the gear wheel 251, the gear 31, the central shaft 3.

Afterwards, the large piston 32 is rightwards displaced again such that the internal and the external turrets 5, and 6 are rightwards displaced at the same time, and the clutch 4 is effectively secured in position for allowing the machining operation with a tool.

From the above description, it can be easily understood that the present invention has advantages as followings:
1. Because single servomotor or single stepper motor is used as the power source, and direction of transmission of power is controlled with the help of pistons and the transmission shaft, there is no need for hydraulic motors, complicated oil passages or control mechanisms for hydraulic motors. Consequently, purchase and maintenance cost can be reduced.
2. Because servomotors, and stepper motors have high precision, the turret of the present invention is easy to control, and efficient with shortened reaction time, suitable for use with high speed machines.
3. Movement can be passed on to related parts for tool choosing action as soon as power transmission is switched in respect of the direction. Therefore, the present invention is efficient.
4. Cool cutting fluid is supplied through the water guiding unit 12 disposed on the projecting seat 11 of the turret housing 1 therefore there is no need to form complicated water passages in the shafts. Consequently, the present invention has simpler structure, and there won't be problems of blockage of water passages.
5. The internal and the external turrets are simultaneously actuated, and the water guiding ring is simple in structure. Therefore, in tool choosing and replacing action, the turrets won't interfere with water supply, and don't have to be first moved to a particular position, saving a lot of troubles.
6. Cuttings and dirt won't be deposited in a small space between the internal and the external turrets because size of the small space between the turrets can't be changed. Consequently, precision of the turrets can't be reduced by cutting and dirt deposit.
7. Because the water supply passages and the switching mechanism for the water supply passages are simplified in the structure, the distance between edges of the turrets can be shortened. Consequently, weight of the turrets reduces, and the shank of a tool used for boring a work piece doesn't have to be projected as long as before, allowing precision of boring to be increased, and allowing high speed machining operation.

What is claimed is:
1. A twin disk type tool turret mechanism of a machine, comprising:
    an internal tool turret for holding a plurality of tools thereon;
    an external tool turret for holding a plurality of tools thereon;
    an external toothed ring securely connected to the internal tool turret; the external toothed ring having a gear fitted thereto;
    a central shaft securely connected to the external tool turret; the central shaft having a gear fitted thereto;
    a power switching member capable of providing power to the internal and the external tool turrets through the external toothed ring and the central shaft respectively; the power switching member including;
    (1) a power source, which is either a servomotor or a stepper motor, and which has a bevel gear secured on an power output shaft thereof;
    (2) a rotary sleeve engaging the bevel gear of the power source at a bevel gear thereof; the rotary sleeve having a plurality of engaging teeth on a middle section thereof;
    (3) a transmission shaft passed into the rotary sleeve and capable of being disengageably engaged with the engaging teeth of the rotary sleeve at engaging teeth thereof for power to be passed on to the transmission shaft through the rotary sleeve; the transmission shaft having a pinion fitted to one end thereof engaged with the gear of the external toothed ring such that the internal tool turret will be made to rotate for allowing a tool choosing action by the power source when the transmission shaft is engaged with the rotary sleeve; and
    (4) a transmission sleeve passed into the rotary sleeve and capable of being disengageably engaged with the engaging teeth of the rotary sleeve at engaging teeth thereof for power to be passed on to the transmission sleeve through the rotary sleeve; the transmission sleeve having a gear fitted to one end thereof engaged with the gear of the central shaft such that the external tool turret will be made to rotate for allowing a tool choosing action by the power source when the transmission sleeve is engaged with the rotary sleeve;
    the transmission shaft having a transmission shaft piston secured thereon, which is actuated and displaced by means of power provided thereto through passage conduits, such that the transmission shaft and the transmission sleeve will be displaced to change between the respective engaging positions and the respective disengaging positions thereof when the transmission shaft piston is displaced with power provided thereto through the passage conduits.

2. A twin disk type tool turret mechanism of a machine, comprising:
    an internal tool turret for holding a plurality of tools thereon;
    an external tool turret for holding a plurality of tools thereon; the internal and the external tool turrets being fitted together;
    an external toothed ring securely connected to the internal tool turret;
    a central shaft securely connected to the external tool turret; the central shaft having a central shaft piston fitted thereto;
    a power switching member capable of providing power to the internal and the external tool turrets through the external toothed ring and the central shaft respectively;
    a clutch including an external ring clutch claw and an internal ring clutch claw respectively securely connected to an inner edge of the internal turret and an inner edge of the external turret; the external and the internal ring clutch claws being capable of rotating, and being engaged with each other at convexities and concavities formed thereon; the clutch having a fixed clutch claw, which is disposed on a fixing ring;
    whereby when the central shaft piston is actuated and displaced, the external turret will be forced to change position, and the internal and the external turrets will be left and right displaced simultaneously between a first position, in which they engage the clutch, and a second position, in which they disengage the clutch.

3. A twin disk type tool turret mechanism of a machine, comprising:
an internal tool turret for holding a plurality of tools thereon;
an external tool turret for holding a plurality of tools thereon; the internal and external tool turrets being fitted together;
an external toothed ring securely connected to the internal tool turret; the external toothed ring having a gear fitted thereto;
a central shaft securely connected to the external tool turret; the central shaft having a gear and a central shaft piston fitted thereto;
a clutch; and
a power switching member capable of providing power to the internal and the external tool turrets through the external toothed ring and the central shaft respectively;
the power switching member including;
(1) a power source, which is either a servomotor or a stepper motor, and which has a bevel gear secured on an power output shaft thereof;
(2) a rotary sleeve engaging the bevel gear of the power source at a bevel gear thereof; the rotary sleeve having a plurality of engaging teeth on a middle section thereof;
(3) a transmission shaft passed into the rotary sleeve and capable of being disengageably engaged with the engaging teeth of the rotary sleeve at engaging teeth thereof for power to be passed on to the transmission shaft through the rotary sleeve; the transmission shaft having a pinion fitted to one end thereof engaged with the gear of the external toothed ring such that the internal tool turret will be made to rotate for allowing a tool choosing action by the power source when the transmission shaft is engaged with the rotary sleeve; and
(4) a transmission sleeve passed into the rotary sleeve and capable of being disengageably engaged with the engaging teeth of the rotary sleeve at engaging teeth thereof for power to be passed on to the transmission sleeve through the rotary sleeve; the transmission sleeve having a gear fitted to one end thereof engaged with the gear of the central shaft such that the external tool turret will be made to rotate for allowing a tool choosing action by the power source when the transmission sleeve is engaged with the rotary sleeve;
the transmission shaft having a transmission shaft piston secured thereon, which is actuated and displaced by means of power provided thereto through passage conduits, such that the transmission shaft and the transmission sleeve will be displaced to change between the respective engaging positions and the respective disengaging positions thereof when the transmission shaft piston is displaced with power provided thereto through the passage conduits;
the clutch including an external ring clutch claw and an internal ring clutch claw respectively securely connected to an inner edge of the internal turret and an inner edge of the external turret; the external and the internal ring clutch claws being capable of rotating, and being engaged with each other at convexities and concavities formed thereon; the clutch having a fixed clutch claw, which is disposed on a fixing ring, such that when the central shaft piston is actuated and displaced, the external turret will be forced to change position, and the internal and the external turrets will be left and right displaced simultaneously between a first position, in which they engage the clutch, and a second position, in which they disengage the clutch.

4. The twin disk type tool turret mechanism as claimed in claim 1 or 3, wherein the pinion of the transmission shaft will be engaged with an internal toothed section formed on a left side of a turret housing when the transmission shaft piston moves leftwards, thus allowing power to be passed on to the transmission sleeve as well as the central shaft to actuate the external turret, and the gear of the transmission sleeve will be inserted in and secured with an internal toothed section formed on a right side of the turret housing when the transmission shaft piston moves rightwards, thus allowing power to be passed on to the transmission shaft as well as the external toothed ring to actuate the internal turret.

5. The twin disk type tool turret mechanism as claimed in claim 1 or 3, wherein an intermediate shaft is arranged between the transmission sleeve and the central shaft, and both a gear wheel and a pinion are secured on the intermediate shaft, and are respectively engaged with the gear of the transmission sleeve and the gear of the central shaft.

6. The twin disk type tool turret mechanism as claimed in claim 1 or 3, wherein a final gear ratio of power transmission to the internal turret through the transmission shaft is equal to that of power transmission to the external turret though the transmission sleeve.

7. The twin disk type tool turret mechanism as claimed in claim 1 or 3, wherein the power source is a stepper motor.

* * * * *